United States Patent [19]

Fujie et al.

[11] 4,196,118
[45] Apr. 1, 1980

[54] FLAME RESISTANT WHOLLY AROMATIC POLYAMIDE FIBERS

[75] Inventors: Hiroshi Fujie; Osamu Kai; Eiji Masunaga; Etuo Sumitani; Akiro Shimomai, all of Iwakuni, Japan

[73] Assignee: Teijin Limited, Osaka, Japan

[21] Appl. No.: 891,779

[22] Filed: Mar. 30, 1978

[30] Foreign Application Priority Data

Mar. 30, 1977 [JP] Japan .................. 52-34381

[51] Int. Cl.$^2$ .................................. C08K 5/52
[52] U.S. Cl. ................ 260/45.7 P; 260/45.7 PH; 260/45.8 A; 260/45.95 G; 264/178 F; 264/210.3; 264/210.6; 525/2
[58] Field of Search ............ 260/45.7 P, 78 SC; 264/178 F, 210 F

[56] References Cited

U.S. PATENT DOCUMENTS

| | | | |
|---|---|---|---|
| 2,610,978 | 9/1952 | Lanham | 260/963 |
| 3,094,511 | 6/1963 | Hill, Jr. et al. | 260/78 R |
| 3,157,613 | 11/1964 | Anderson et al. | 260/45.7 P |
| 3,355,436 | 11/1967 | Lutz et al. | 521/108 |
| 3,557,053 | 1/1971 | Miller | 260/45.7 P |
| 3,639,506 | 2/1972 | Haaf | 260/876 R |
| 3,781,388 | 12/1973 | Jenkner et al. | 260/953 |
| 3,787,372 | 1/1974 | Blocker et al. | 260/78 SC |
| 3,875,108 | 4/1975 | Koch et al. | 260/45.7 RL |
| 4,014,829 | 3/1977 | Baird et al. | 260/17.2 |
| 4,073,837 | 2/1978 | Kouzai et al. | 264/178 F |
| 4,075,269 | 2/1978 | Jones, Jr. et al. | 264/210 F |
| 4,075,269 | 2/1978 | Jones, Jr. et al. | 260/78 SC |
| 4,083,825 | 4/1978 | Albright et al. | 260/45.7 P |
| 4,092,281 | 5/1978 | Bertrand | 260/45.7 P |
| 4,120,914 | 10/1978 | Behnke et al. | 260/45.7 P |
| 4,129,551 | 12/1978 | Rueter et al. | 260/45.7 P |

OTHER PUBLICATIONS

Hilado, Flammability Handbook for Plastics, 1969, pp. 82–86.

*Primary Examiner*—Harold D. Anderson
*Assistant Examiner*—R. A. White
*Attorney, Agent, or Firm*—Sughrue, Rothwell, Mion, Zinn and Macpeak

[57] ABSTRACT

A wholly aromatic polyamide fiber which comprises a wholly aromatic polyamide and an organic phosphorus compound having one or more halogen atoms. The wholly aromatic polyamide has repeating units of which at least about 85 mol % are represented by the formula:

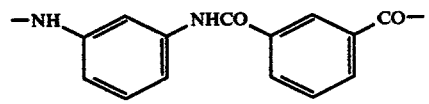

The amount of the organic phosphorus compound having one or more halogen atoms is such as to provide a halogen atom content of 0.5% to 25.0% and a phosphorus atom content of 0.05% to 6.0% by weight of the wholly aromatic polyamide. The obtained wholly aromatic polyamide fiber has excellent flame-resistance, good color and good fiber properties.

11 Claims, No Drawings

FLAME RESISTANT WHOLLY AROMATIC POLYAMIDE FIBERS

BACKGROUND OF THE INVENTION

1. Field of the Invention

This invention relates to a wholly aromatic polyamide fiber having improved flame-resistance. More particularly, this invention is concerned with a wholly aromatic polyamide fiber which contains an organic phosphorus compound having one or more halogen atoms to display excellent flame-resistance.

2. Description of the Prior Art

It is well known that the wholly aromatic polyamide fibers have excellent thermal stabilities and mechanical properties because of their rigid molecular structure and high crystallinity, and further have excellent fire-proofing and self-extinguishing properties because of the inherent property of their molecules.

Since the wholly aromatic polyamide fibers have excellent thermal stabilities, fire-proofing and self-extinguishing properties, they have been used as filters, belts, mechanical parts for a dyeing machine and a washing machine which are exposed to high temperatures. They have also been widely used as protecting wears for people who work at high temperature furnaces, such as a blast furnace, electric furnace and incinerator, fire-proofing wears for firemen, protective clothing for people who work for welding under high temperature sparks, fire-proofing wears for people who handle highly inflammable chemicals or suits for racing drivers, which have hitherto been made from glass fibers, asbestos fibers or phenol resin fibers. Since the wholly aromatic polyamide fibers possess their good fiber properties owned by conventional fibers for clothing use, e.g., natural fibers such as cotton and wool, and organic synthetic fibers such as polyamide, polyester and polyacrylonitrile fibers, they are far superior as protecting wears in processability, comfortability, washability and aesthetic property as compared with conventional glass fibers, asbestos fibers, phenol resin fibers and metal laminating materials.

However, the wholly aromatic polyamide fabric has a disadvantage of becoming melted or shrunken and making holes in the fabric when it is exposed to a high temperature flame or sparks. It is, therefore, necessary to improve such disadvantage in order to enlarge the use of the wholly aromatic polyamide fibers as protecting wears.

Heretofore, methods have been proposed to improve the melt-shrinking property (flame-resistance) of the wholly aromatic polyamide fibers.

For example, U.S. Pat. No. 4,014,829, Baird et al, issued on Mar. 29, 1977, and British Pat. Specification No. 1,438,067, published on June 3, 1976, disclose flame-resistant textile fibers which are obtained by impregnating poly(m-phenylene isophthalamide) fibers with tetrakis hydroxymethyl phosphonium compound and a resin containing active hydrogen (e.g., melamine-formaldehyde resin), and heating the impregnated fibers to form a cross-linked reaction product of the tetrakis hydroxymethyl phosphonium compound and the resin in the fibers.

U.S. Pat. No. 4,008,345, Imanaka et al, issued on Feb. 15, 1977, discloses a process for fire-proofing treatment of shaped articles of aromatic polyamides which comprises contacting a shaped article of an aromatic polyamide with an aqueous solution of a halogen- and sulfur-free, phosphorus-containing inorganic acid, drying at a temperature of not higher than about 150° C., and then post heat-treating at a temperature ranging from about 300° C. to about 450° C.

These methods for post-treating the wholly aromatic polyamide fibers as described above have the disadvantages that the obtained articles tend to have unfavorable color and tend to have poor fiber properties, and further flame-resistance is still unsatisfactory.

SUMMARY OF THE INVENTION

It has now been found that if a specific amount of an organic phosphorus compound having one or more halogen atoms is compounded in the wholly aromatic polyamide fibers, the above-mentioned disadvantages of the prior art can be substantially overcome.

It is, therefore, one object of the present invention to provide a wholly aromatic polyamide fiber having improved flame-resistance as well as good color and good fiber properties.

It is another object of the present invention to provide a process for the preparation of the above wholly aromatic polyamide fiber.

The above-mentioned objects are attained by the wholly aromatic polyamide fiber according to the present invention, which comprises (a) a wholly aromatic polyamide having repeating units of which at least about 85 mol % are represented by the formula

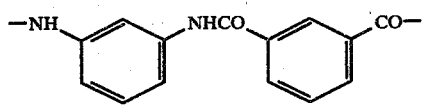

and (b) an organic phosphorus compound having one or more halogen atoms in such an amount as to provide a halogen atom content of about 0.5% to about 25.0% and a phosphorus atom content of about 0.05% to about 6.0% by weight of the wholly aromatic polyamide.

DESCRIPTION OF THE PREFERRED EMBODIMENTS

As disclosed in British Pat. Specification No. 871,581, published on June 28, 1961, the wholly aromatic polyamides are characterized by being made up of the structural unit —NH—Ar1—NHCO—Ar2—CO— wherein Ar1 and Ar2 are the same or different and are substituted or unsubstituted divalent aromatic radicals in which the chain extending bonds are not ortho oriented with respect to each other or to bonds linking one aromatic ring directly or through a linking group to another aromatic ring. As the substituent groups (if any) in the aromatic rings, there may be alkyl, alkoxy, carbalkoxy, nitro and halogen substituents of up to 5 carbon atoms each, where the total number of carbon atoms in substituent groups attached to any one aromatic ring does not exceed nine carbon atoms.

The wholly aromatic polyamides employed in the present invention comprise repeating units of which at least about 85 mol %, preferably at least 95 mol %, are represented by the formula:

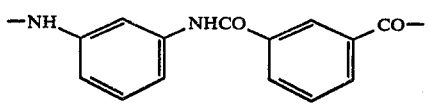

These wholly aromatic polyamides can be prepared, for example, by reacting an aromatic diamine, such as m-phenylenediamine, with an aromatic dicarboxylic acid halide, such as isophthaloyl chloride in an organic solvent, such as tetrahydrofuran, dioxane, acetone, methyl ethyl ketone, tetramethylsulfone, methylene chloride, chloroform, 1,2-dichloroethane, dimethylformamide, dimethylacetamide and N-methyl-2-pyrrolidone. The preparation of the wholly aromatic polyamides is described in more detail, for example, in U.S. Pat. Nos. 3,006,899, 3,063,966, 3,640,970 and 4,009,154. The wholly aromatic polyamide is dissolved, for example, in a basic amide solvent, such as N-methyl-2-pyrrolidone, dimethylacetamide and dimethylformamide to form a spinning solution. The spinning solution is extruded into an aqueous coagulating bath containing an inorganic salt, such as calcium chloride, magnesium chloride, zinc chloride and calcium nitrate, or is dry-spun into a hot air column to form wholly aromatic polyamide fibers. The preparation of the wholly aromatic polyamide fibers is described in more detail, for example, in U.S. Pat. Nos. 3,360,598 and 3,963,664.

As the organic phosphorus compound having one or more halogen atoms employed in the present invention, there can be exemplified alkyl and/or phenyl phosphates having one or more halogen atoms, such as phenyldi-(chloropropyl)phosphate, tris(chloroethyl)phosphate, tris(2,3-dichloropropyl)phosphate, tris(trichlorophenyl)-phosphate and tris(tribromophenyl)phosphate; alkyl and/or phenyl phosphites having one or more halogen atoms, such as tris(chloroethyl)phosphite, tris(2,3-dichloropropyl)phosphite, tris(trichlorophenyl)phosphite and tris(tribromophenyl)phosphite; acidphosphates having one or more halogen atoms, such as di(chloroethyl)-monohydricphosphate and chloroethyldihydricphosphate. Tris(2,3-dichloropropyl)phosphate and tris(trichlorophenyl)phosphate are preferable.

In the present invention, the amount of the organic phosphorus compound contained in the wholly aromatic polyamide is such as to provide a halogen atom content of about 0.5% to about 25.0%, preferably 1.0% to 5.0% and a phosphorus atom content of about 0.05% to about 6.0%, preferably 0.1% to 1.5% by weight of the wholly aromatic polyamide.

The method for introducing the organic phosphorus compound into the wholly aromatic polyamide is not particularly critical in the present invention. The organic phosphorus compound is preferably dissolved in a basic amide solvent, such as dimethylformamide, dimethylacetamide and N-methyl-2-pyrrolidone, and then the wholly aromatic polyamide is dissolved in the solution to form a spinning solution. It is also preferable to add the organic phosphorus compound to a spinning dope obtained by dissolving the wholly aromatic polyamide in the basic amide solvent.

The wholly aromatic polyamide fibers in the present invention can be obtained by a dry-spinning method or a wet-spinning method using the obtained spinning solution. In order to obtain the wholly aromatic polyamide fibers having good color and good fiber properties, the wet-spinning method is preferred in which the temperature applied to the fibers in the spinning process is lower than the dry-spinning method. In particular, the preparation of the wholly aromatic polyamide fibers in the present invention can be preferably effected by the following process, which comprises; adding an organic phosphorus compound having one or more halogen atoms to a N-methyl-2-pyrrolidone solution of a wholly aromatic polyamide having a polymer concentration within a range of about 15% to about 23% by weight of the solution to form a spinning solution, wherein the amount of the organic phosphorus compound having one or more halogen atoms is such as to provide a halogen atom content of about 0.5% to about 25.0% and a phosphorus atom content of about 0.05% to about 6.0% by weight of the wholly aromatic polyamide; extruding the spinning solution through a spinning nozzle into an aqueous solution containing from about 25% to about 45% by weight of an inorganic salt based on the weight of the solution to coagulate the polymer in the fiber form; drawing the obtained fibers at a draw ratio of about 1.5 to about 3.5 in a water bath at a temperature of about 70° C. to 100° C.; and further drawing the fibers at a draw ratio of about 1.1 to about 3.5 on a hot plate at a temperature of about 300° C. to about 370° C.

According to the present invention, it is possible to obtain wholly aromatic polyamide fibers having excellent flame-resistance as well as good color and fiber properties, and they can be widely used for various kinds of protecting wears.

The present invention is more specifically illustrated in the following examples. The various physical properties mentioned in the examples are defined as follows:

(1) Intrinsic Viscosity [η]

Intrinsic viscosity [η] was measured at 30° C. in 98% conc. sulfuric acid.

(2) Tensile Strength and Elongation

Tensile strength and elongation at break of the wholly aromatic polyamide fiber were measured by means of an Instron tensile tester (gauge length 20 mm, rate of elongation 100%/min.) in accordance with the method described in JIS L-1069.

(3) Tear Strength and Elongation of Fabric

Tear strength at break of the wholly aromatic polyamide fabric was measured in accordance with the method described in JIS L-1079 5.14 A-1. Elongation at break of the wholly aromatic polyamide fabric was measured in accordance with the method described in JIS L-1068.

(4) Shrinkage

The wholly aromatic polyamide fiber was heated at a temperature of 300° C. for 15 minutes in air. The shrinkage was shown by percent as a rate of shrinkage to the original length of the fiber.

(5) LOI (Limiting Oxygen Index)

The LOI is the minimum fraction of oxygen in an oxygen/nitrogen mixture required just to support burning of the sample. This test was conducted in accordance with the method described in JIS K 7201 (1972) B, No. 1. Larger LOI values show a better fire-proofing property.

(6) Flame-Resistance

A knitted fabric was prepared from the wholly aromatic polyamide fibers. The inflammability of the knitted fabric was measured in accordance with the method described in JIS 1079 (1966) 5. 27 Inflammability A Method, except that the distance between the top of an alcohol burner and a test sample was 2.5 cm. The grading is as follows:

A ... Carbonizes but keeps the fiber form, free from melt-shrinking;
B ... Slightly melt-shrunken;
C ... Greatly melt-shrunken to make a hole.

EXAMPLES 1 to 6

An organic phosphorus compound having halogen atoms as shown in Table I was added to a N-methyl-2-pyrrolidone solution containing 21% by weight of poly(m-phenylene isophthalamide) of an intrinsic viscosity of 1.80 based on the weight of the solution to form a spinning solution containing 10% by weight of the organic phosphorus compound based on the weight of the polymer.

The spinning solution was extruded into an aqueous bath containing 37% by weight of calcium chloride at a rate of 11.2 m/min through a spinning nozzle having 100 orifices each with a diameter of 0.09 mm to coagulate the polymer into the filament form.

The obtained (undrawn) filaments were washed with water and drawn 3.0 times the original length in a water bath at 98° C., and were further drawn 1.5 times on a hot plate at 360° C. to obtain wholly aromatic polyamide filaments having a total denier of about 200.

The physical properties of the obtained filaments are shown in Table I.

The filaments according to Examples 1 to 6 of the present invention had excellent flame-resistance as compared with Control 1, substantially possessing good fiber-properties.

Table I

|  | Organic phosphorus compound having halogen atoms | Tensile strength at break (g/d) | Elongation at break (%) | Shrinkage (%) | LOI | Flame-resistance |
|---|---|---|---|---|---|---|
| Example 1 | Tris(chloroethyl)phosphate | 4.9 | 20 | 7 | 36 | A |
| Example 2 | Tris(2,3-dichloropropyl)phosphate | 4.8 | 20 | 6 | 37 | A |
| Example 3 | Phenyldi(chloropropyl)phosphate | 4.9 | 25 | 6 | 36 | A |
| Example 4 | Tris(tribromophenyl)phosphate | 4.5 | 35 | 7 | 43 | A |
| Example 5 | Tris(2,3-dichloropropyl)phosphite | 4.8 | 20 | 6 | 36 | A |
| Example 6 | Tris(trichlorophenyl)phosphate | 5.0 | 35 | 7 | 42 | A |
| Control 1* | — | 5.3 | 30 | 4 | 28 | C |

*Poly(m-phenylene isophthalamide) filament not containing an organic phosphorus compound having halogen atoms.

Comparative Examples 1 to 5

A wholly aromatic polyamide filaments were produced by the same procedure as in Example 1, except that a fire-proofing agent having only halogen atoms or a phosphorus atom was used in place of an organic phosphorous compound having halogen atoms.

The physical properties of the obtained filaments are shown in Table II.

The filaments according to Comparative Examples 1 to 5 had good LOI values as compared with Control 1, but were poor in flame-resistance.

Table II

|  | Fire-proofing agent | Tensile strength at break (g/d) | Elongation at break (%) | Shrinkage (%) | LOI | Flame-resistance |
|---|---|---|---|---|---|---|
| Comparative Example 1 | Pentabromodiphenyl-ether | 5.2 | 27 | 6 | 32 | C |
| Comparative Example 2 | Decabromodiphenyl-ether | 5.0 | 23 | 8 | 32 | C |
| Comparative Example 3 | Tetrabromophthalic anhydride | 5.0 | 27 | 7 | 33 | C |
| Comparative Example 4 | Triphenylphosphate | 4.8 | 25 | 7 | 36 | C |
| Comparative Example 5 | Triphenylphosphite | 4.6 | 25 | 6 | 34 | C |

EXAMPLE 7

Tris(chloroethyl)phosphate was added to a N-methyl-2-pyrrolidone solution containing 21% by weight of poly(m-phenylene isophthalamide) of an intrinsic viscosity of 1.80 based on the weight of the solution to form a spinning solution containing 10% by weight of tris(chloroethyl)phosphate based on the weight of the polymer. The spinning solution was extruded into an aqueous bath containing 45% by weight of calcium chloride at a rate of 11.2 m/min through a spinning nozzle having 1000 orifices each with a diameter of 0.07 mm to coagulate the polymer and formed into a tow. The obtained (undrawn) tow was washed with water and drawn 3.0 times the original length in a boiling water bath, and was further drawn 1.5 times on a hot plate at 360° C. to obtain a wholly aromatic polyamide tow having a total denier of about 2,000.

The tow was treated with an oiling agent mainly comprising a mixture of sodium lauryl phosphate and oleyl phosphate and crimped with a stuffer crimper, and the crimped tow was cut to a fiber length of 51 mm to form staple fibers each with 2 denier. The staple fibers were made into 40 count single spun yarns, and then a twin spun yarn was produced by twisting two single span yarns. A satin fabric having a weight of 190 g/m$^2$ was prepared from the obtained twin spun yarns.

As a control (Control 2), a satin fabric consisting of poly(m-phenylene isophthalamide) fibers was prepared according to the same procedure as described above.

The physical properties of these twin satin fabrics are shown in Table III.

The fabric (Example 7) in accordance with the present invention had higher LOI valve and better flame-resistance.

Table III

| | Tear strength at break (kg/5cm) | | Elongation at break (%) | | | Flame-resistance ** |
|---|---|---|---|---|---|---|
| | warp | weft | warp | weft | LOI | |
| Example 7 | 134 | 111 | 42.6 | 36.2 | 36 | A |
| Control 2 | 149 | 123 | 46.3 | 39.3 | 28 | C |

** The test was conducted by using the satin fabric in accordance with the method of Test (6).

What is claimed is:

1. A wholly aromatic polyamide fiber having improved flame-resistance characterized by excellent resistance to melting, shrinking and forming holes upon exposure to a high temperature flame or sparks, which comprises (a) a wholly aromatic polyamide having repeating units of which at least about 85 mol % are represented by the formula

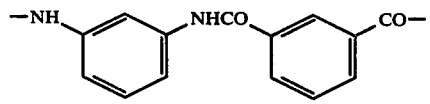

and (b) an organic phosphorus compound having halogen atoms in such an amount as to provide a halogen atom content of about 0.5% to about 25.0% and a phosphorus atom content of about 0.05% to about 6.0% by weight of the wholly aromatic polyamide, wherein said organic phosphorus compound having halogen atoms is a member selected from the group consisting of tris-(2,3-dichloropropyl)phosphate, tris(trichlorophenyl)-phosphate and a mixture thereof.

2. The wholly aromatic polyamide fiber of claim 1, wherein said wholly aromatic polyamide comprises repeating units of which at least 95 mol % are represented by the formula:

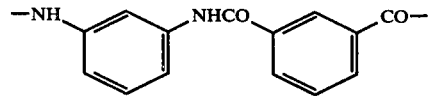

3. The wholly aromatic polyamide fiber of claim 1, wherein said halogen atom content is 1 to 5% and said phosphorus atom content is 0.1 to 1.5% by weight of the wholly aromatic polyamide.

4. The wholly aromatic polyamide fiber of claim 1, wherein said wholly aromatic polyamide per se has inherently excellent fire-proofing and self-extinguishing properties, and said organic phosphorus compound improves the flame-resistance thereof.

5. The wholly aromatic polyamide fiber of claim 4, consisting essentiallly of said wholly aromatic polyamide and said aromatic phosphorus compound.

6. A process for the preparation of wholly aromatic polyamide fiber having improved flame resistance characterized by excellent resistance to melting, shrinking and forming holes upon exposure to a high temperature flame or sparks, which comprises; adding an organic phosphorus compound having halogen atoms to a N-methyl-2-pyrrolidone solution of a wholly aromatic polyamide having a polymer concentration within a range of about 15% to about 23% by weight of the solution to form a spinning solution, wherein said wholly aromatic polyamide has repeating units of which at least about 85 mol % are represented by the formula:

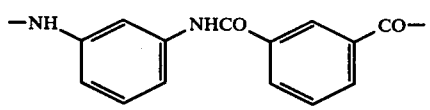

and the amount of said organic phosphorus compound having halogen atoms is such as to provide a halogen atom content of about 0.05% to about 25.0% and a phosphorus atom content of about 0.05% to about 6.0% by weight of the wholly aromatic polyamide, wherein said organic phosphorus compound having halogen atoms is a member selected from the group consisting of tris-(2,3-dichloropropyl)phosphate, tris(trichlorophenyl-phosphate and a mixture thereof; extruding the spinning solution into an aqueous solution containing from about 25% to about 45% by weight of an inorganic salt based on the weight of the solution to coagulate the polymer into the fiber form; drawing the obtained fibers at a draw ratio of about 1.5 to about 3.5 in a water bath at a temperature of about 70° C. to 100° C.; and further drawing the fibers at a draw ratio of about 1.1 to about 3.5 on a hot plate at a temperature of about 300° C. to about 370° C.

7. The process of claim 6, wherein said wholly aromatic polyamide comprises repeating units of which at least 95 mol % are represented by the formula:

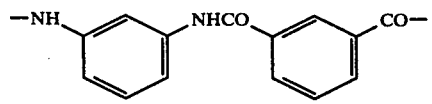

8. The process of claim 6, wherein said inorganic salt is a member selected from the group consisting of calcium chloride, magnesium chloride, zinc chloride, calcium nitrate and a mixture thereof.

9. The process of claim 6, wherein said halogen atom content is 1 to 5% and said phosphorus atom content is 0.1 to 1.5% by weight of the wholly aromatic polyamide.

10. The process of claim 6, wherein said wholly aromatic polyamide per se has inherently excellent fire-proofing and self-extinguishing properties, and said organic phosphorus compound improves the flame-resistance thereof.

11. The process of claim 10, wherein said wholly aromatic polyamide fiber consists essentially of said organic phosphorus compound and said wholly aromatic polyamide.

* * * * *